(12) United States Patent
Kameyama

(10) Patent No.: US 12,683,534 B2
(45) Date of Patent: Jul. 14, 2026

(54) MOTOR CONTROL DEVICE AND IMAGE FORMING APPARATUS

(71) Applicant: CANON KABUSHIKI KAISHA, Tokyo (JP)

(72) Inventor: Shigeru Kameyama, Shizuoka (JP)

(73) Assignee: Canon Kabushiki Kaisha, Tokyo (JP)

( * ) Notice: Subject to any disclaimer, the term of this patent is extended or adjusted under 35 U.S.C. 154(b) by 382 days.

(21) Appl. No.: 18/322,457

(22) Filed: May 23, 2023

(65) Prior Publication Data

US 2023/0384718 A1 Nov. 30, 2023

(30) Foreign Application Priority Data

May 27, 2022 (JP) ................................. 2022-086502

(51) Int. Cl.
*H02P 6/08* (2016.01)
*H02P 29/66* (2016.01)

(52) U.S. Cl.
CPC .................................... *H02P 29/66* (2016.02)

(58) Field of Classification Search
CPC .......... G03G 15/2039; G03G 15/5008; G03G 15/205; G03G 15/80; G03G 15/5037; H02P 29/64; H02P 6/08; H02P 29/66

USPC ......................................................... 318/473
See application file for complete search history.

(56) References Cited

U.S. PATENT DOCUMENTS

| 2013/0202323 A1* | 8/2013 | Takeuchi ............. G03G 15/205 |
| | | 399/69 |
| 2017/0307448 A1* | 10/2017 | Takashima ............. G01K 7/427 |
| 2017/0336740 A1* | 11/2017 | Kikegawa .......... G03G 15/2039 |
| 2017/0336741 A1* | 11/2017 | Kikegawa ............. G03G 15/205 |
| 2019/0393812 A1* | 12/2019 | Kameyama ............. G03G 15/80 |
| 2020/0235689 A1* | 7/2020 | Miyashita .......... G03G 15/5008 |

FOREIGN PATENT DOCUMENTS

| JP | 2005204358 A | 7/2005 |
| JP | 2008062916 A | 3/2008 |
| JP | 2014128122 A | 7/2014 |
| JP | 2017195704 A | 4/2016 |

* cited by examiner

*Primary Examiner* — Gabriel Agared

(74) *Attorney, Agent, or Firm* — Canon U.S.A., Inc. IP Division

(57) ABSTRACT

An estimation unit estimates a first coil temperature in a state where the motor is stopped, and a second coil temperature in a state where the motor is driven, and the control unit controls the driving of the motor based on the first coil temperature and the second coil temperature.

16 Claims, 10 Drawing Sheets

FIG.7

MOTOR CONTROL DEVICE AND IMAGE FORMING APPARATUS

BACKGROUND

Technical Field

The aspect of the embodiments relates to a technique for controlling a motor.

Description of the Related Art

In a motor, such as a direct current (DC) brushless motor, used as a driving source for an image forming apparatus, the coil current increases according to the output torque, and heat generation in the coils mounted on the motor also increases. For the coils, the allowable maximum temperature is defined according to insulation class, and thus, the motor is to be driven so that the temperature of the coils does not exceed the allowable maximum temperature.

In the publication of Japanese Patent Application Laid-Open No. 2005-204358, from the value of the ambient temperature of a motor measured by a temperature sensor and the temperature rise value of coils of the motor estimated from the square value of the current value of a current that has flowed through the coils, the coil temperature is estimated.

However, in a case where a temperature sensor is to be used to detect the ambient temperature of a motor, space for placing the temperature sensor and a corresponding circuit is to be provided.

SUMMARY

According to an aspect of the embodiments, a device includes an application unit configured to apply a voltage to a motor including a plurality of coils to apply a current to the plurality of coils, a detection unit configured to detect the current, an estimation unit configured to estimate a coil temperature based on the detected current, and a control unit configured to control driving of the motor based on the coil temperature. The estimation unit estimates a first coil temperature in a state where the motor is stopped, and a second coil temperature in a state where the motor is driven. The control unit controls the driving of the motor based on the first coil temperature and the second coil temperature.

Further features of the disclosure will become apparent from the following description of exemplary embodiments with reference to the attached drawings.

BRIEF DESCRIPTION OF THE DRAWINGS

FIG. 7 is a flowchart illustrating processing regarding the coil temperature.

DESCRIPTION OF THE EMBODIMENTS

With reference to the accompanying drawings, exemplary embodiments will be described in detail below. The following exemplary embodiments do not limit the disclosure according to the appended claims. Although a plurality of features is described in the exemplary embodiments, not all the plurality of features is essential for the disclosure, and the plurality of features may be optionally combined together. Further, in the accompanying drawings, the same or similar components are designated by the same reference numbers, and are not redundantly described.

Figure 1:
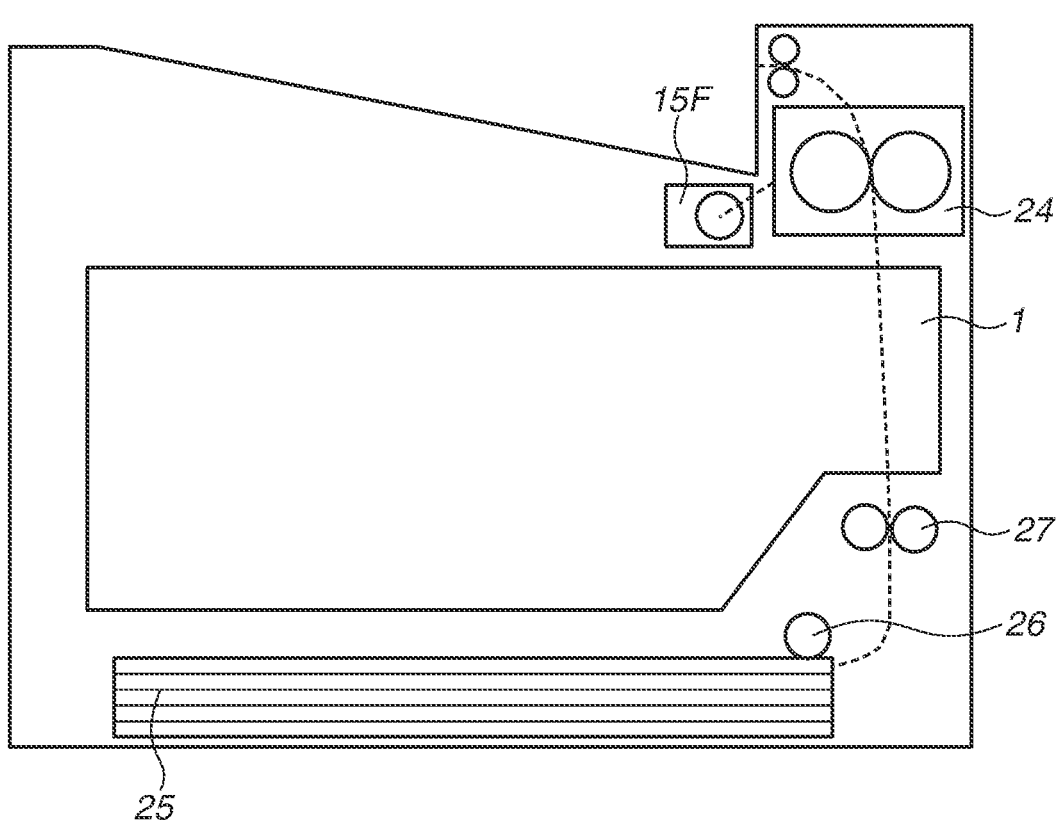
FIG. 1 is a diagram illustrating a general configuration of an image forming apparatus.

A first exemplary embodiment of the disclosure will be described below. FIG. 1 is a diagram illustrating the general configuration of an image forming apparatus according to the first exemplary embodiment. Examples of the image forming apparatus include a printing apparatus, a printer, a copying machine, a multifunction peripheral, and a facsimile machine. A sheet stored in a sheet feeding cassette 25 is fed by a sheet feeding roller 26. The fed sheet is conveyed by conveying rollers 27.

An image forming unit 1 forms an electrostatic latent image on a photosensitive drum based on image data and causes a developing unit to develop the formed electrostatic latent image as images using toners of yellow, magenta, cyan, and black colors. The developed images are primarily transferred onto an intermediate transfer belt, thus being superimposed on each other and forming a color image. The image formed on the intermediate transfer belt is secondarily transferred to the sheet. A fixing device 24 includes a heating roller and a pressure roller. The fixing device 24 heats and pressurizes the sheet to which the image is secondarily transferred, thereby fixing the image to the sheet. The sheet having been subjected to the fixing process is discharged to outside the image forming apparatus. A motor 15F is a driving source for rotating the rollers of the fixing device 24. Although not illustrated, a motor for driving a member different from the fixing device 24 is also included in the image forming apparatus in addition to the motor 15F.

Figure 2:
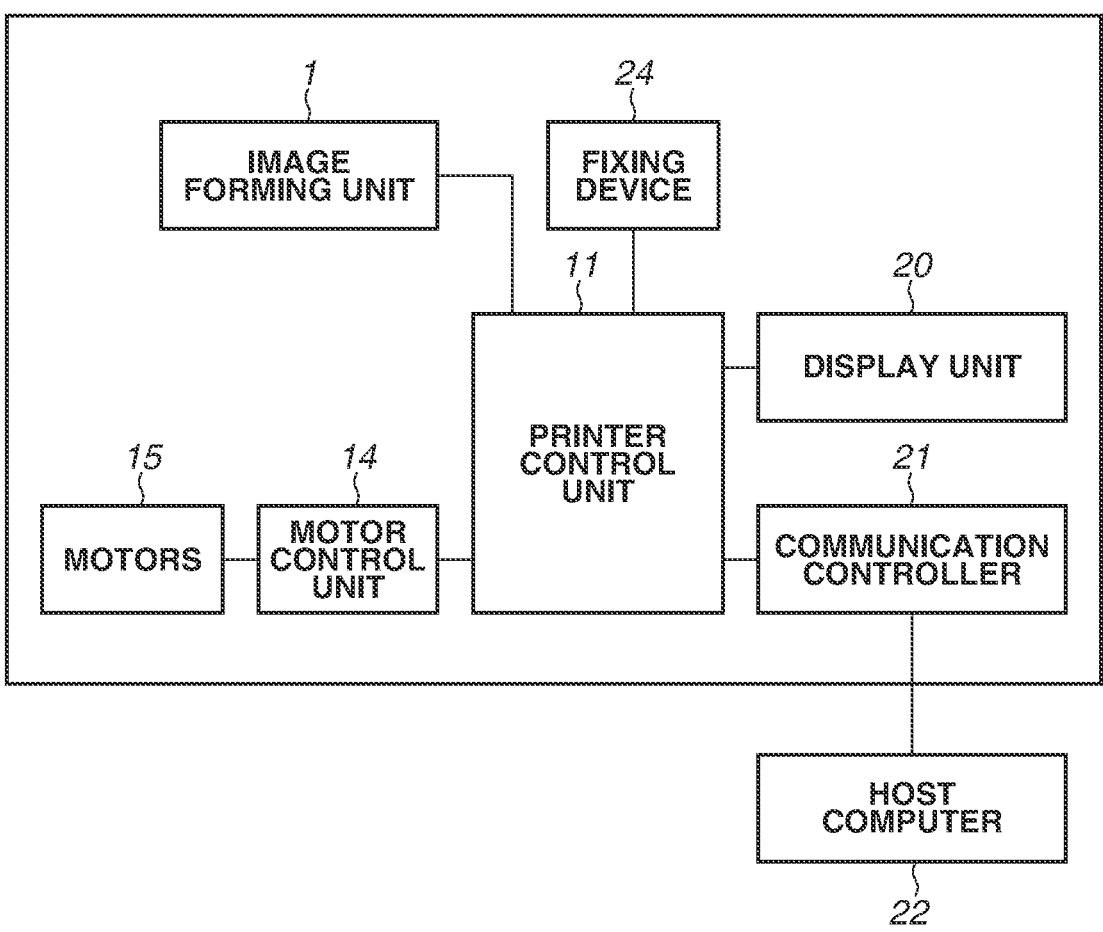
FIG. 2 is a diagram illustrating a control configuration of the image forming apparatus.

FIG. 2 illustrates the control configuration of the image forming apparatus. A printer control unit 11 controls the entirety of the image forming apparatus. If the printer control unit 11 receives image data from a host computer 22 via a communication controller 21, the printer control unit 11 controls the image forming unit 1 to form an image on a sheet and causes the fixing device 24 to fix the image to the sheet. At this time, the printer control unit 11 controls a motor control unit 14 to control motors 15 including the motor 15F, thus controlling the conveyance of the sheet.

The printer control unit 11 displays the state of the image forming apparatus on a display unit 20. The printer control unit 11 includes a microcomputer and a memory. The memory holds various control programs and data, and the microcomputer controls the components of the image forming apparatus based on the various control programs and the data stored in the memory. The printer control unit 11 stores print job information, such as a print job execution time and the number of printed sheets, regarding each print job in the memory.

Figure 3:
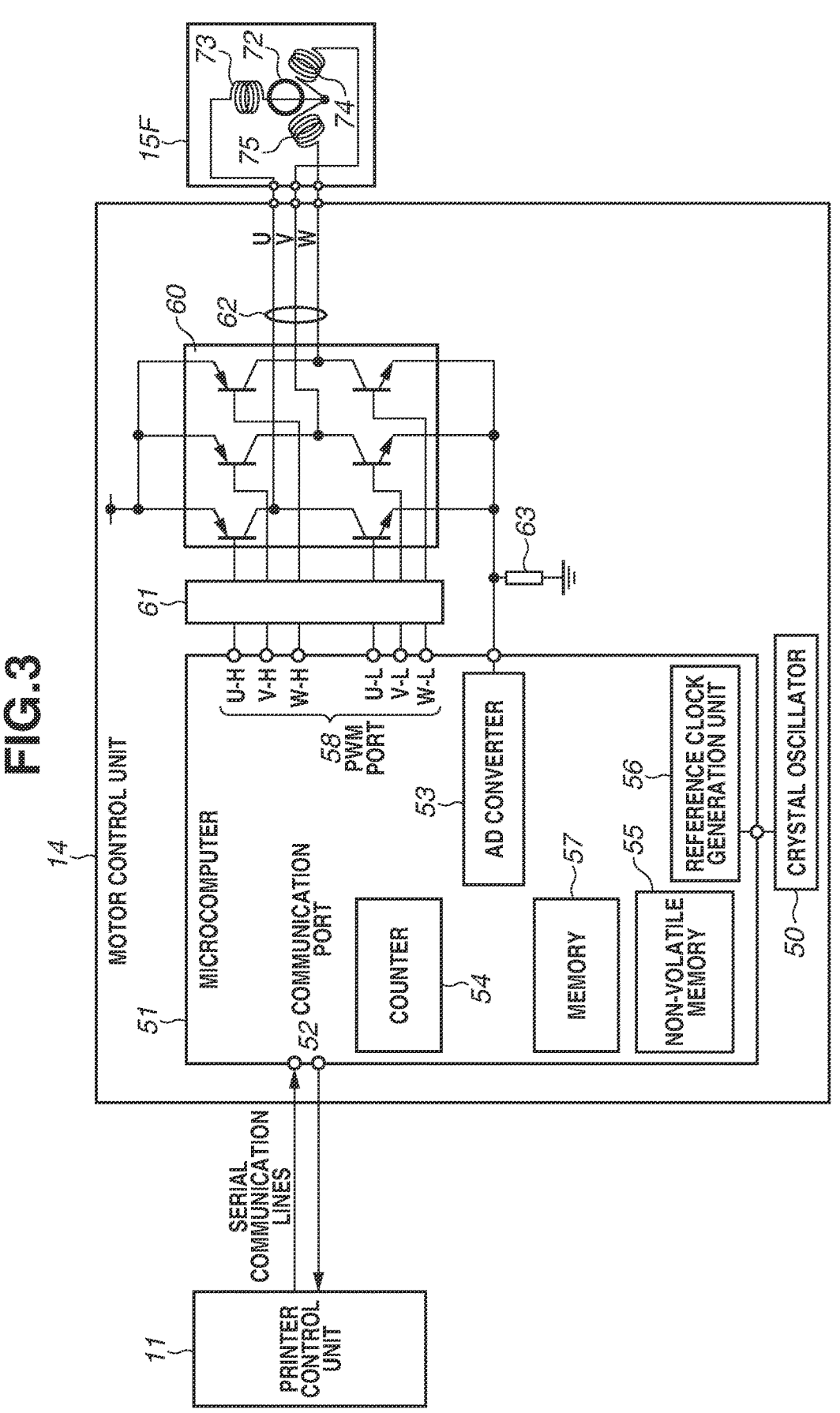
FIG. 3 is a diagram illustrating a control configuration of a motor.

FIG. 3 illustrates the details of the control configuration of the motor 15F. The motor control unit 14 includes a microcomputer 51. The microcomputer 51 communicates with the printer control unit 11 via a communication port 52. A reference clock generation unit 56 of the microcomputer 51 is connected to a crystal oscillator 50 and generates a reference clock based on the output of the crystal oscillator 50. A counter 54 performs a count operation based on the reference clock. The microcomputer 51 outputs a pulse-width modulation signal (PWM signal) from a PWM port 58. In the present exemplary embodiment, the microcomputer 51 outputs a total of six PWM signals, namely, PWM signals on a high side (U-H, V-H, and W-H) and PWM signals on a low side (U-L, V-L, and W-L), with respect to coils of three phases (a U-phase, a V-phase, and a W-phase) of the motor 15F. Thus, the PWM port 58 includes six terminals U-H, V-H, W-H, U-L, V-L, and W-L.

The terminals U-H, V-H, W-H, U-L, V-L, and W-L of the PWM port 58 are connected to a gate driver 61, and the gate driver 61 controls the on/off states of switching elements of a three-phase inverter 60 based on the PWM signals. The inverter 60 includes a total of six switching elements, three on the high side and three on the low side, with respect to the three phases. The gate driver 61 controls each switching element based on the corresponding PWM signal. As the switching element, for example, a transistor or a field-effect transistor (FET) is useable. In the present exemplary embodiment, if the PWM signal is high, the corresponding switching element is turned on. If the PWM signal is low, the corresponding switching element is turned off. An output 62 of the inverter 60 is connected to coils 73 (the U-phase), 74 (the V-phase), and 75 (the W-phase) of the motor 15F. Controlling the on/off states of the switching elements of the inverter 60 enables control of an excitation current of each of the coils 73, 74, and 75.

As described above, the microcomputer 51, the gate driver 61, and the inverter 60 function as a voltage control unit (a voltage application unit) that controls voltages to be applied to the plurality of coils 73, 74, and 75. The excitation current that has flowed through each of the coils 73, 74, and 75 is converted into a voltage by a resistor 63, and the voltage is input to an analog-to-digital (AD) converter 53 of the microcomputer 51. The AD converter 53 converts the voltage value (an analog value) of the resistor 63 into a digital value (such a conversion is also referred to "AD conversion"). The microcomputer 51 detects the current value of the coil current based on the digital value output from the AD converter 53. In this manner, the resistor 63 and the AD converter 53 form a current detection unit. The microcomputer 51 includes a non-volatile memory 55 and a memory 57 that store various pieces of data for use in controlling the motor 15F.

<Configuration of Motor>

Figure 4A:
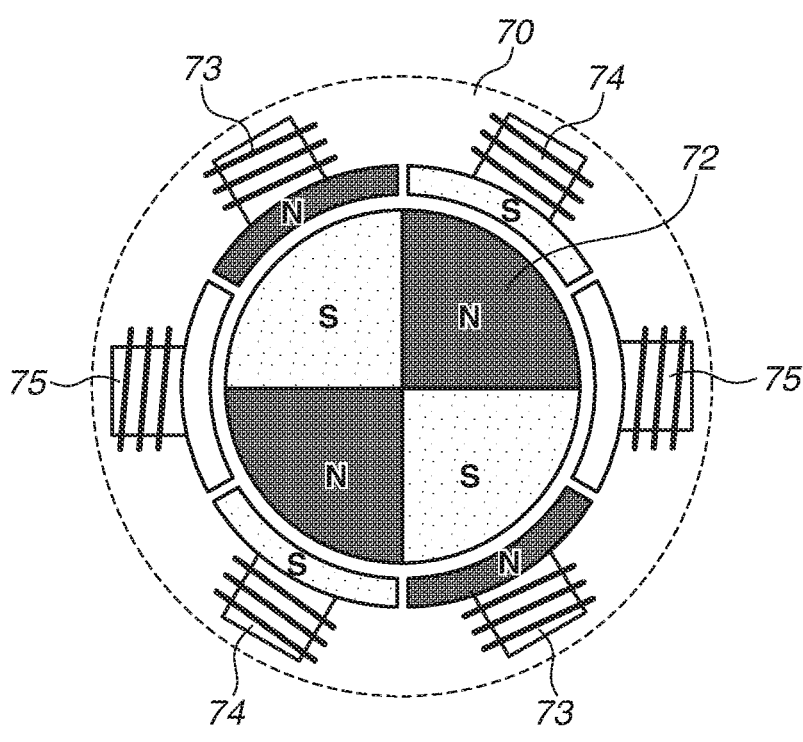
FIGS. 4A and 4B are diagrams illustrating a configuration of the motor.
Figure 4B:
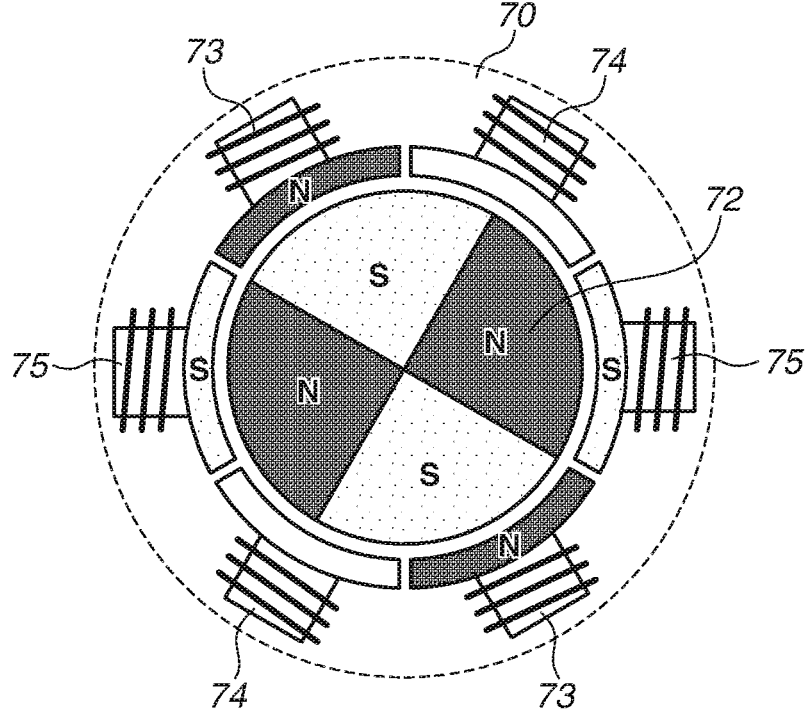

FIGS. 4A and 4B are each a diagram illustrating the configuration of the motor 15F. The motor 15F includes a six-slot stator 70 and a four-pole rotor 72. The stator 70 is coils obtained by winding copper wires around cores. The coils includes the coils 73, 74, and 75 of the respective phases.

The rotor 72 includes a permanent magnet and has two pairs of a north (N) pole and a south (S) pole. The position at which the rotor 72 stops is determined according to an excitation phase. The excitation phase is indicated by the permutation of two of the plurality of coils 73, 74, and 75. In other words, there are a total of six excitation phases, namely, U-V, U-W, V-U, V-W, W-U, and W-V phases. The "U-V phase" here means that an excitation current is applied from the U-phase coil 73 to the V-phase coil 74 via a neutral point 76. For example, if the U-V phase is excited, the rotor 72 stops at a rotational position illustrated in FIG. 4A. At this time, the U-phase becomes N-poles, and the V-phase becomes S-poles. Next, if the U-W phase is excited, the rotor 72 stops at a rotational position illustrated in FIG. 4B.

If the excitation current is set to 0 by stopping the driving of the motor 15F, the force to hold the rotor 72 ceases to act. The rotor 72 then rotates if a rotational force is applied from outside to the rotor 72. Thus, when the fixing device 24 is attached to or detached from the image forming apparatus, or when a sheet jammed in the fixing device 24 is removed, the rotor 72 may rotate by an external force. If the rotor 72 rotates in this manner, the motor control unit 14 cannot determine the stop position of the rotor 72 after the rotor 72 rotates by the external force. Also immediately after the image forming apparatus is turned on, the motor control unit 14 cannot determine the stop position of the rotor 72. Thus, to rotate the motor 15F, the motor control unit 14 initially performs a detection process for detecting the stop position of the rotor 72 (hereinafter also referred to as "initial position detection").

Generally, a coil has a configuration in which a heat-resistant enamel copper wire is wound around a core with electromagnetic steel sheets laminated. If there is an external magnetic field, the magnetic permeability of the electromagnetic steel sheets decreases. Since the inductance of the coil is proportional to the magnetic permeability of the core, if the magnetic permeability of the core decreases, the inductance of the coil also decreases. For example, in one embodiment, only the S-poles of the rotor 72 are opposed to the U-phase coil 73 in FIG. 4A, so that the rate of decrease in the inductance of the U-phase coil 73 is greater than that of the W-phase coil 75 to which both the S-poles and the N-poles of the rotor 72 are opposed.

The amount of change in the inductance differs based on whether the direction of a magnetic field generated by the excitation current and the direction of the external magnetic field are the same direction or opposite directions. More specifically, in the state of FIG. 4A, the excitation current is applied in the same direction as a magnetic field generated by the S-poles of the rotor 72 opposed to the U-phase coil 73, in other words, the excitation current is applied so that the U-phase coil 73 becomes N-poles. As a result, the amount of decrease in the inductance is greater than in a case where the excitation current is applied so that the U-phase coil 73 becomes S-poles, in other words, in a case where the current is applied in a direction opposite to the magnetic field generated by the S-poles of the rotor 72 opposed to the U-phase coil 73. In this manner, the detected inductance differs according to the stop position of the rotor 72 and the excitation phase. The inductance changes, so that iron loss of the coil changes. Thus, the resistance component of the coil also changes. Hereinafter, the inductance component and the resistance component of the coil will also be collectively referred to as "the impedance of the coil".

<Estimation of Coil Temperature during Stoppage of Motor>

In the present exemplary embodiment, to reduce an error in the estimation of the coil temperature during the rotation of the motor 15F, the coil temperature of the motor 15F is initially estimated in the stop state of the motor 15F. As will be described below, the motor 15F has the property that the inductance of the coils changes according to a change in the temperature of the rotor 72.

An external magnetic field generated by the rotor 72 is mainly applied by the magnet used in the rotor 72, a metal included in the rotor 72, and magnetic paths formed by the electromagnetic steel sheets around which the copper wires are wound in the coils. If the motor 15F is rotated, a current according to the load torque flows, and copper loss and iron loss raise the temperature of the stator 70, in other words, the copper wires and the cores of the coils. Then, the rise in the temperature of the stator 70 also raises the temperature of the rotor 72.

Figure 5A:
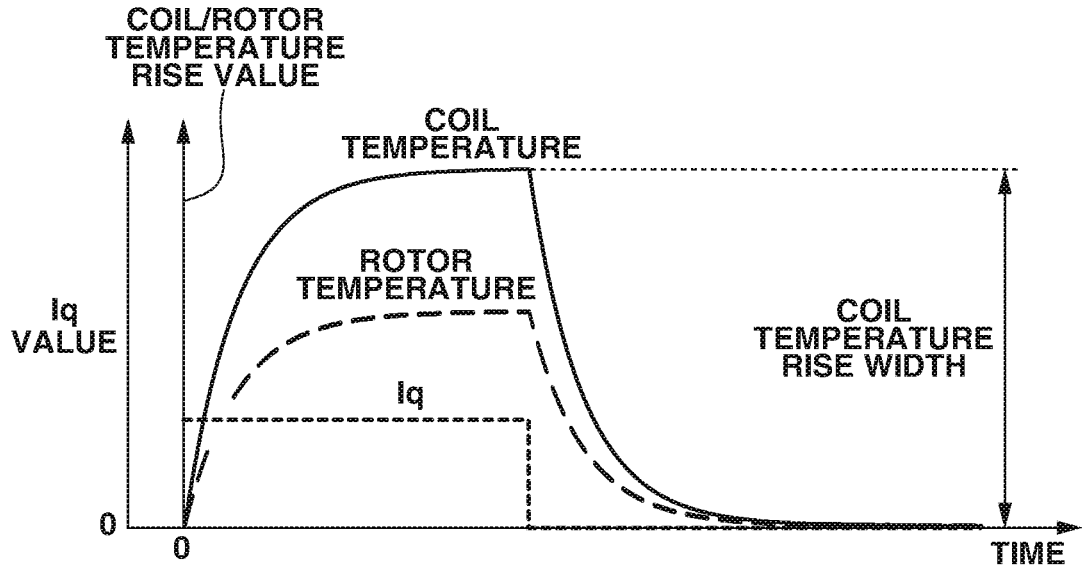
FIG. 5A is a diagram illustrating examples of changes in temperatures of coils and a rotor of the motor.

FIG. 5A is a graph illustrating examples of changes in the temperatures of the coils and the rotor. The coil temperature, the rotor temperature, and the temperature change curves of the respective temperatures can be approximately represented by first-order lag curves, and the time constants of the changes in the respective temperatures are substantially the same. The material of the magnet used in the rotor 72 is ferrite or neodymium, for example. A ferrite magnet has the property of demagnetizing at a rate of –0.18% per temperature rise of 1° C. A neodymium magnet has the property of demagnetizing at a rate of –0.12% per temperature rise of 1° C.

Thus, if the temperature of the rotor 72 changes, the influence of the external magnetic field generated by the rotor 72 on the coils changes. If the influence of the external magnetic field changes, the amount of decrease in the inductance of the coils changes. For example, if the temperature of the rotor 72 rises, the magnet of the rotor 72 demagnetizes, and the influence (strength) of the external magnetic field generated by the rotor 72 decreases. As a result, the amount of decrease in the inductance of the coils due to the influence of the external magnetic field decreases.

Using such properties of the motor 15F, a physical quantity that changes according to the inductance of the coils is measured in the stop state of the motor 15F, and the temperature of the coils is estimated based on the measurement result. More specifically, in the state where the motor 15F is stopped, the microcomputer 51 excites an excitation phase corresponding to the stop position of the rotor 72 among the plurality of excitation phases and measures a physical quantity that changes according to the inductance of at least one of the coils 73, 74, and 75. Further, the motor control unit 14 estimates the temperature of the at least one coil from the measurement value of the measured physical quantity.

Since the inductance of the coils changes due to a change in the magnetic force of the rotor 72 according to the temperature of the rotor 72 as described above, what is found from the change in the inductance is the change in the magnetic force of the rotor 72 and therefore the temperature of the rotor 72 in principle. A change in the temperature of the rotor 72 and a change in the temperature of the coils, however, are correlated to each other, and these temperatures change along first-order lag curves with almost the same time constants. Thus, in actual use, the coil temperature can be directly estimated using the relationship between the coil temperature and the inductance of the coils.

A specific method of estimating the temperature of the coils is described below. An example is described where the coil temperature is estimated in the state where the U-V phase of the motor 15F is excited and the rotor 72 is stopped at the position illustrated in FIG. 4A. In other words, an example is described where the coil temperature is estimated after the rotor 72 is pulled in a predetermined phase and stopped.

Figures 6A, 6B:
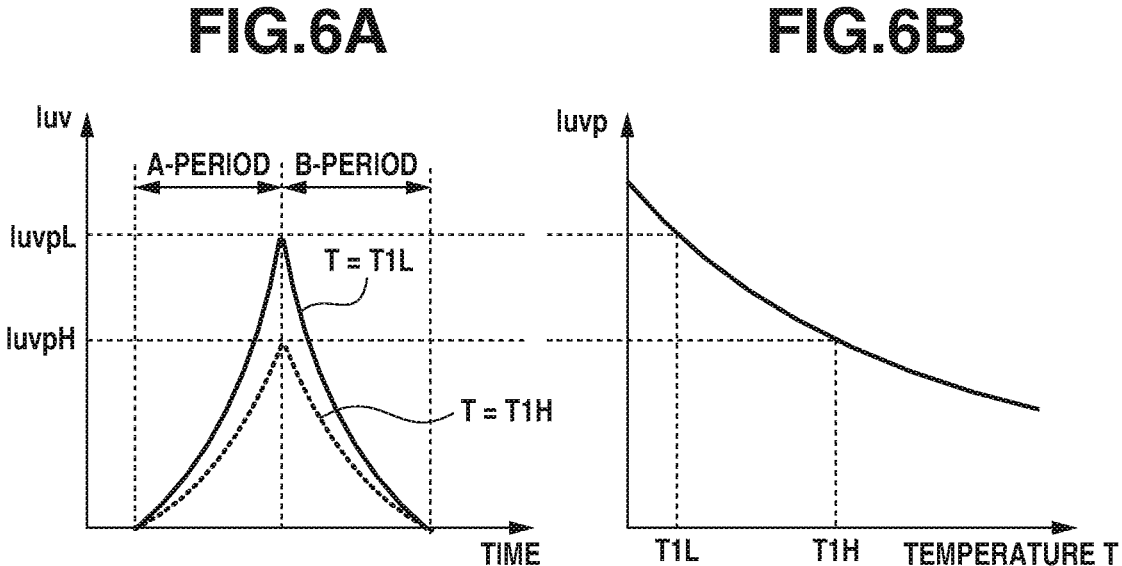
FIGS. 6A and 6B are diagrams illustrating an example of a relationship between an excitation current flowing through the coils and the temperature of the coil.

FIGS. 6A and 6B are diagrams illustrating an example of the relationship between an excitation current flowing through the coils and the temperature of the coils of the motor 15F. In the state where the rotor 72 is stopped at the position corresponding to the U-V phase as illustrated in FIG. 4A, the microcomputer 51 excites the U-V phase over a predetermined period and measures an excitation current Iuv flowing from the U-phase coil 73 to the V-phase coil 74. FIG. 6A illustrates examples of changes over time in the excitation current Iuv obtained by this measurement. In FIG. 6A, a solid line indicates a change over time in the measurement value of the excitation current Iuv in a case where a temperature T of the coils 73 and 74 is low (T=T1L). A dashed line indicates a change over time in the excitation current Iuv in a case where the temperature T of the coils 73 and 74 is high (T=T1H). The relationship of the temperature T is T1H>T1L.

The microcomputer 51 drives the inverter 60 as follows using the PWM signals output from the PWM port 58, thus exciting the U-V phase. In other words, the microcomputer 51 performs control to apply the excitation current Iuv from the U-phase coil 73 to the V-phase coil 74. Initially, during an A-period (also referred to as a "first period"), the duty cycle of the PWM signal output from the U-H terminal of the PWM port 58 is set to 50%. Further, to perform synchronous rectification, if the output voltage of the U-H terminal is at a high (H) level, the output voltage of the U-L terminal is set to a low (L) level. If the output voltage of the U-H terminal is at the L-level, the output voltage of the U-L terminal is set to the H-level. During the A-period, the output voltage of the V-L terminal is set to the H-level (the duty cycle of the PWM signal output from the V-L terminal is set to 100%), and the output voltages of the other terminals are set to the L-level (the duty cycles of the PWM signals output from the other terminals are set to 0%).

During a B-period (also referred to as a "second period") after the A-period, the duty cycle of the PWM signal output from the V-H terminal of the PWM port 58 is set to such a value that the excitation current Iuv is approximately zero at the time when the B-period elapses. Here, the duty cycle of the PWM signal is set to 35% as an example. Further, if the output voltage of the V-H terminal is at the H-level, the output voltage of the V-L terminal is set to the L-level. If the output voltage of the V-H terminal is at the L-level, the output voltage of the V-L terminal is set to the H-level.

During the B-period, the output voltage of the U-L terminal is set to the H-level (the duty cycle of the PWM signal to be output from the U-L terminal is set to 100%), and the output voltages of the other terminals are set to the L-level (the duty cycles of the PWM signals to be output from the other terminals are set to 0%). The time lengths of the A-period and the B-period are determined based on the accuracy of detecting the peak value of an excitation current to be applied, with the length of the period when the rotor 72 continues to be stopped in a case where the motor 15F is excited in the state where the rotor 72 is stopped being set to an upper limit. Here, each of the time lengths of the A-period and the B-period is 0.5 ms, as an example.

The microcomputer 51 drives the inverter 60 as described above, so that the excitation current Iuv increases during the A-period as illustrated in FIG. 6A. If the coil temperature T=T1L, the peak value of the excitation current Iuv is IuvpL as indicated by the solid line. If the coil temperature T=T1H, the peak value of the excitation current Iuv is IuvpH as indicated by the dashed line. The magnitude of the peak value is IuvpL>IuvpH. At either temperature, the excitation current Iuv decreases during the B-period after the A-period.

FIG. 6B illustrates an example of a change in a peak value Iuvp with respect to such a change in the coil temperature T. The higher the coil temperature T is, the smaller the peak value Iuvp is. The properties of the coil temperature T and the peak value Iuvp illustrated in FIGS. 6A and 6B are the properties with the position of the rotor 72 fixed. If the position of the rotor 72 changes, the inductance and the combined inductance of the coils also change.

As described above, with a rise in the coil temperature, the temperature of the rotor 72 rises. If the temperature rises, the peak value Iuvp of the excitation current Iuv decreases. In the present exemplary embodiment, the coil temperature is estimated based on such properties of the motor 15F. For example, in the state where the rotor 72 is stopped at the position corresponding to the U-V phase (the position illustrated in FIG. 4A), the microcomputer 51 causes the inverter 60 to excite the U-V phase, which is an excitation phase corresponding to the stop position of the rotor 72.

Further, the microcomputer 51 measures a physical quantity (a detection result) that changes according to the inductance of at least one of the coils 73, 74, and 75 (e.g., the combined inductance of the U-V phase). The microcomputer 51 measures the peak value Iuvp of the excitation current Iuv flowing through the coils 73 and 74 forming the U-V phase. The printer control unit 11 then estimates the temperature of the coils 73 and 74 from the peak value Iuvp of the excitation current Iuv measured by the microcomputer 51.

The coil temperature is estimated based on, for example, information indicating the correspondence relationship between the peak value Iuvp of the excitation current Iuv and the coil temperature T as illustrated in FIG. 6B and acquired in advance. For example, this correspondence information is stored in advance in the non-volatile memory 55 in the microcomputer 51. The microcomputer 51 determines the coil temperature corresponding to the measured peak value Iuvp to be a coil temperature estimated value Ts, based on the correspondence information stored in the non-volatile memory 55.

The microcomputer 51 determines whether the printer is stopped for a period greater than or equal to the time constant for a change in the temperature of the motor 15F, based on previous print job information. If the microcomputer 51 determines that the printer is stopped for a period greater than or equal to the time constant, and it can be determined that the temperature of the motor 15F is almost equivalent to the printer atmosphere temperature, a coil temperature rise value ΔTs during the stoppage of the motor 15F is set to zero, and an assumed atmosphere temperature Tas is set to the coil temperature estimated value Ts. If previous print job information is absent, and the difference between the temperature of the motor 15F and the printer atmosphere temperature is unknown, the assumed atmosphere temperature Tas is determined to be the upper limit temperature of a use temperature range.

The coil temperature rise value ΔTs during the stoppage of the motor 15F is obtained using the following formulae (1) and (2). If Ts>Tas, ΔTs is calculated using formula (1). If Ts<Tas, ΔTs is calculated using formula (2).

$$\Delta Ts = Ts - Tas \tag{1}$$

$$\Delta Ts = 0 \tag{2}$$

The information stored in the non-volatile memory 55 may be, for example, information indicating a numerical table or information indicating an approximate curve. In a case where the coil temperature T is estimated from the peak value Iuvp using the numerical table (i.e., information indicating discrete values), a method of referencing the closest value to the measured peak value Iuvp among the values stored in the non-volatile memory 55 may be used. A method of, for example, linearly interpolating a plurality of values may be used.

<Estimation of Coil Temperature During Rotation of Motor>

Next, an estimation method of estimating a coil temperature rise value during the rotation of the motor 15F is described. As described above, changes in the temperatures of the coils and the rotor 72 can be approximated using first-order lag curves having approximately certain time constants according to a driving current value during the rotation of the motor 15F. In the present exemplary embodiment, a coil temperature estimated value is estimated based on a value obtained by processing the driving current value during the rotation of the motor 15F through a first-order low-pass filter. A motor rotation time is measured.

Figure 5B:
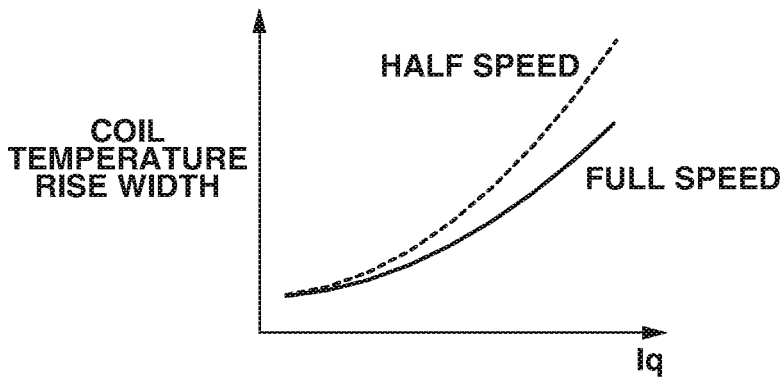
FIG. 5B is a diagram illustrating an example of a relationship between a current value and a coil temperature rise value.

A specific method of estimating the coil temperature is described below. With reference to FIG. 5A, the driving time of the motor 15F and a change in the temperature of the coils are described. The driving current value is a value (an Iq value) obtained by converting detected currents of the three phases into a q-axis component perpendicular to the magnetic flux direction (a d-axis) of the rotor 72. As illustrated in FIG. 5B, the greater the Iq value is, the greater the coil temperature rise width is. If the Iq value is the same, the slower the motor rotation speed is, the greater the coil temperature rise width is. This is because the faster the motor rotation speed is, the more air the rotor 72 or the coils come into contact with. In other words, an air cooling action increases. The "coil temperature rise width" as used herein refers to the difference between the initial temperature of the coils and the saturation temperature of the coils after the coil temperature rises due to the driving of the motor 15F.

Next, the low-pass filter process is described. As the first-order low-pass filter process, for example, a coil temperature rise value ΔT in each predetermined cycle can be estimated using the following formula (3).

$$\Delta T[n] = \alpha \times \Delta T[n-1] + (1-\alpha) \times \beta \times Iq[n] \tag{3}$$

In formula (3), α is a time constant, and β is gain. α indicates the responsiveness of a change in the coil temperature. β indicates the temperature rise width of the coils relative to the Iq value.

ΔT[n] is the estimated coil temperature rise value, and Iq[n] is the Iq value described above. ΔT[n−1] is the previous calculation result of formula (3). As an initial value ΔT[0] in formula (3), the coil temperature rise value ΔTs during the stoppage of the motor 15F is set. In other words, in the state where ΔT[0]=ΔTs, a calculation process of calculating ΔT[1] and after that is performed.

Next, the coil temperature T is calculated using formula (4).

$$T[n] = \Delta T[n] + Tas \tag{4}$$

The coil temperature T is obtained by adding the assumed atmosphere temperature Tas to the coil temperature rise value ΔT.

The calculation cycle of formulae (3) and (4) is determined according to the time constant of a change in the temperature of the motor 15F and set to a cycle that can sufficiently follow a change in the temperature. In the present exemplary embodiment, as an example, the calculation cycle is a 1-second cycle. Iq[n] is the average value of the Iq value in one second. The values of the parameters $\alpha$ and $\beta$ are obtained from the result of actually measuring change in the temperature during the driving of the motor 15F in advance and stored in the non-volatile memory 55 in the microcomputer 51.

In the present exemplary embodiment, the image forming apparatus has four printing modes. The printing modes are one-sided printing full speed (a motor rotation speed of 2000 rpm), two-sided printing full speed (a motor rotation speed of 2000 rpm), one-sided printing half speed (a motor rotation speed of 1000 rpm), and two-sided printing full speed (a motor rotation speed of 1000 rpm). The image forming apparatus has a numerical table for each of these four printing modes. Here, $\alpha$ is the same regardless of the printing mode or the current value. $\beta$ is stored as data indicating the relationship between the Iq value and the temperature rise width as illustrated in FIG. 5B with respect to each of the four printing modes.

"The relationship between the Iq value and the temperature rise width" differs depending on the motor rotation speed because, as described above, the temperature rise width changes according to whether the air cooling action is large or small. "The relationship between the Iq value and the temperature rise width" also differs between one-sided printing and two-sided printing. This is because the motor ambient temperature changes. In the case of the two-sided printing, a sheet heated by the fixing device 24 passes through the image forming apparatus again, and therefore, the motor ambient temperature becomes higher than in the case of the one-sided printing. The value of the parameter R is appropriately set again according to the current value during the rotation of the motor 15F using "the data indicating the relationship between the Iq value and the temperature rise width with respect to each of the four printing modes".

The information stored in the non-volatile memory 55 may be, for example, information indicating a numerical table or information indicating an approximate curve. In a case where the coil temperature is estimated using the numerical table (i.e., information indicating discrete values), a method of referencing the closest value to the measured current value among the values stored in the non-volatile memory 55 may be used, or a method of, for example, linearly interpolating a plurality of values may be used.

<Coil Overheat Prevention Process>

Next, a motor coil overheat prevention process during a printing operation is described. More specifically, if the result of estimating the coil temperature during the rotation of the motor 15F exceeds a predetermined threshold (also referred to as a "first threshold"), the image forming apparatus transitions to a printing prevention mode. In the present exemplary embodiment, a margin is set for the allowable maximum temperature on the assumption that coils of insulation class B are used, and the first threshold is 100° C.

If the coil temperature estimated value is greater than or equal to 100° C., then after a sheet on which an image is formed at the time when the coil temperature estimated value exceeds the threshold is discharged to outside the image forming apparatus, the motor 15F is stopped. After the motor 15F is stopped, a coil temperature estimation operation is performed, thus acquiring a coil temperature estimated value Ts2 in a case where the motor 15F is stopped. If the coil temperature estimated value Ts2 is less than or equal to the first threshold, the printing operation continues. At this time, the value of $\Delta T[0]$ is set to the coil temperature rise value $\Delta Ts$ during the stoppage of the motor 15F obtained from the coil temperature estimated value Ts2 and the assumed atmosphere temperature Tas. The assumed atmosphere temperature Tas may be corrected based on the difference between the coil temperature estimated value Ts2 and the latest estimated coil temperature T[nlast] during the rotation.

If the coil temperature estimated value Ts2 exceeds the first threshold, the image forming apparatus transitions to the printing prevention mode. In the printing prevention mode, the printing operation is temporarily suspended to lower the coil temperature. In a case where the image forming apparatus transitions to the printing prevention mode, and if the coil temperature lowers faster due to the air cooling effect by rotating the motor 15F than by stopping the motor 15F, the motor 15F may be rotated for a predetermined period. In a case where the printing is performed at half speed, the motor 15F may be rotated at full speed, thus enhancing the air cooling effect. For example, the transmission of drive to a load transmitting a driving force from the motor 15F is blocked, thus reducing the load torque to be applied to the motor 15F. The motor 15F may be rotated at high speed for a predetermined period and then stopped. At this time, the motor 15F may be rotated at high speed by increasing the number of rotations of the motor 15F compared to the number of rotations of the motor 15F according to a printing speed set in a case where an image is formed on a sheet, so long as the temperature reduction effect is enhanced.

In the printing prevention mode, during the stop period of the motor 15F, the coil temperature estimation operation during the stoppage of the motor 15F is performed in a predetermined cycle. Thus, the degree of lowering of the coil temperature of the motor 15F is checked. For example, the coil temperature is estimated in a 10-second cycle, and if the estimated coil temperature is less than or equal to a predetermined threshold (also referred to as a "second threshold"), the printing operation is resumed. In the present exemplary embodiment, as an example, the second threshold is 90° C.

When the printing operation is resumed, the value of $\Delta T[0]$ is set to the coil temperature rise value $\Delta Ts$ during the stoppage of the motor 15F obtained from the latest coil temperature estimated value during the stoppage of the motor 15F and the assumed atmosphere temperature Tas. During the printing operation, the coil temperature during the rotation of the motor 15F is estimated.

<Flowchart>

Figure 7:
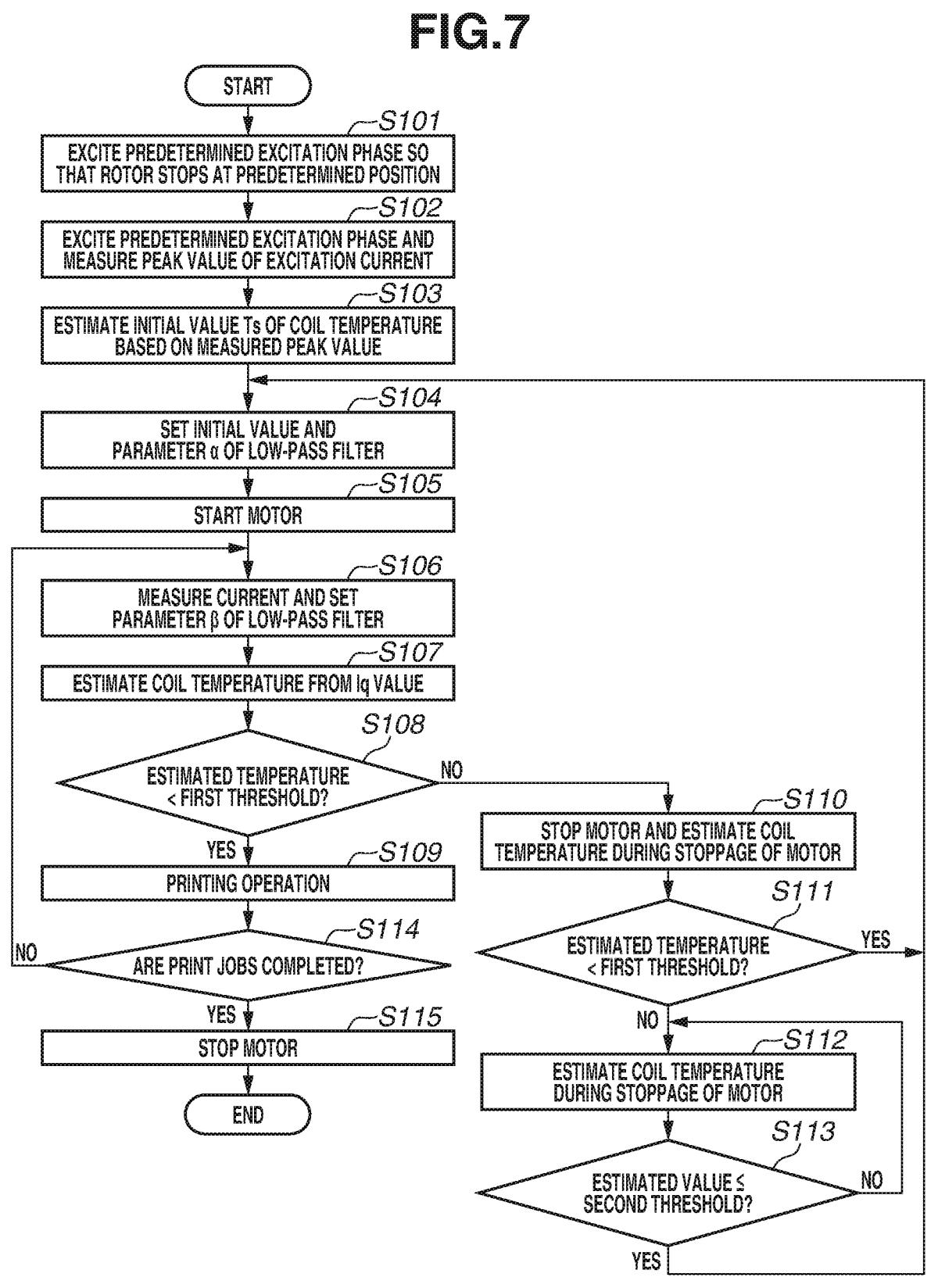

FIG. 7 is a flowchart illustrating processing regarding the coil temperature according to the present exemplary embodiment.

In the present exemplary embodiment, the printer control unit 11 controls the printing operation based on the estimated temperature of the coils 73, 74, and 75. As an example, a case is illustrated where, as in the above example, the rotor 72 is stopped at the position illustrated in FIG. 4A (the position corresponding to the U-V phase), and the coil temperature is estimated. The motor control unit 14 controls the excitation of the motor 15F and a process that requires the operation of the motor control unit 14, such as the estimation of the coil temperature, based on an instruction from the printer control unit 11. The estimation result of the coil temperature is transmitted from the motor control unit 14 to the printer control unit 11. While processing performed by printer control unit 11 and the motor control unit 14 is described as an example here, control may be performed by two or more control units or a single control unit.

In step S101, the motor control unit 14 excites a predetermined excitation phase (the U-V phase in this case) so that the rotor 72 stops at a predetermined position. More specifically, the motor control unit 14 outputs the PWM signals in a predetermined pattern from the PWM port 58 for a predetermined time (e.g., several hundreds of milliseconds) and drives the inverter 60, thus exciting the U-V phase of the motor 15F. Thus, the rotor 72 moves to a predetermined position where the influence of the external magnetic field on the U-V phase is strongest (the stop position corresponding to the U-V phase). At this time, the amount of decrease in the combined inductance of the U-V phase is greatest.

In step S102, the motor control unit 14 measures the peak value Iuvp of the excitation current Iuv flowing through the coils 73 and 74 forming the U-V phase. More specifically, the motor control unit 14 outputs the PWM signals in a measurement pattern for measuring the peak value Iuvp from the PWM port 58 and drives the inverter 60. The motor control unit 14 measures the peak value Iuvp of the excitation current Iuv.

In step S103, based on the peak value Iuvp of the excitation current Iuv, the motor control unit 14 estimates the temperature estimated value Ts which is the initial temperature of the coils 73 and 74. In step S104, the motor control unit 14 sets ΔT[0] and a of the low-pass filter. In step S105, the motor control unit 14 starts the motor 15F.

In step S106, during the rotation of the motor 15F, the motor control unit 14 measures the current, converts the current into the Iq value, averages the Iq value, and sets the parameter β of the low-pass filter. In step S107, the motor control unit 14 acquires the coil temperature estimated value using the obtained Iq value.

In step S108, the printer control unit 11 compares the coil temperature estimated value and the first threshold. If the coil temperature estimated value is less than (falls below) the first threshold (YES in step S108), then in step S109, the printer control unit 11 continues the printing operation. If, on the other hand, the coil temperature estimated value is greater than or equal to (exceeds) the first threshold (NO in step S108), then in step S110, the printer control unit 11 temporarily suspends the printing operation. The motor control unit 14 stops the motor 15F and estimates the coil temperature during the stoppage of the motor 15F.

In step S111, the printer control unit 11 compares the coil temperature estimated value during the stoppage of the motor 15F and the first threshold. If the coil temperature estimated value is less than (falls below) the first threshold (YES in step S111), the processing returns to step S104. If, on the other hand, the coil temperature estimated value is greater than or equal to (exceeds) the first threshold (NO in step S111), the printer control unit 11 transitions to the printing prevention mode. In step S112, the printer control unit 11 estimates the coil temperature during the stoppage of the motor 15F in a predetermined cycle.

In step S113, the printer control unit 11 compares the coil temperature estimated value and the second threshold. If the coil temperature estimated value is greater than (exceeds) the second threshold (NO in step S113), the processing returns to step S112. In step S112, the printer control unit 11 acquires the coil temperature estimated value. If the coil temperature estimated value is less than or equal to (falls below) the second threshold (YES in step S113), the printing prevention mode is cancelled. The processing then returns to step S104 and the operation in step S104 is performed. In step S114, the printer control unit 11 determines whether all print jobs are completed. If not all the print jobs are completed (NO in step S114), the processing returns to step S106. If all the print jobs are completed (YES in step S114), then in step S115, the printer control unit 11 stops the motor 15F, and the processing ends.

Thus, in the state where the motor 15F is stopped, an excitation phase corresponding to the stop position of the rotor 72 is excited, and a physical quantity that changes according to the inductance of at least one of the coils 73, 74, and 75 is measured. Further, the coil temperature during the stoppage of the motor 15F is estimated using the measurement value of the measured physical quantity (e.g., the peak value of an excitation current). Further, the coil temperature during the rotation of the motor 15F is estimated using the current value during the rotation of the motor 15F.

According to the present exemplary embodiment, it is possible to estimate the coil temperature during the rotation of the motor 15F without newly including a temperature sensor for detecting the motor ambient temperature. Thus, even if the coil temperature of the motor 15F rises more than assumed due to, for example, an increase in the load torque, it is possible to control the driving of the motor 15F so that the coil temperature does not exceed the maximum allowable temperature according to the wiring class of the coils.

The parameters of the low-pass filter are set according to the current value, so that it is possible to estimate the temperature without squaring the current value, thus reducing the processing load of the microcomputer 51. If a temperature sensor for measuring the printer ambient temperature is mounted on the printer, the temperature value measured by the temperature sensor may be used as the value of the assumed atmosphere temperature Tas. This can further reduce an error in temperature estimation.

A second exemplary embodiment of the disclosure will be described below. In the second exemplary embodiment, when the coil temperature during the stoppage of the motor 15F is estimated, the rotor 72 is not pulled in, and a physical quantity when each excitation phase is excited in the state where the rotor 72 of the motor 15F is stopped is measured. The coil temperature is estimated based on the measurement result of the measured physical quantity. In the present exemplary embodiment, components similar to those in the first exemplary embodiment, such as the image forming apparatus, are designated by the same signs, and are not described in detail.

The motor control unit 14 sequentially excites each of the plurality of excitation phases (the U-V phase, the U-W phase, the V-U-phase, the V-W phase, the W-U phase, and the W-V phase) of the motor 15F and measures a physical quantity when each excitation phase is excited. The physical quantity to be measured changes according to the inductance of at least one of the plurality of coils 73, 74, and 75 forming the plurality of excitation phases. In the present exemplary embodiment, as in the first exemplary embodiment, an example is described where the peak value of an excitation current is measured as the physical quantity.

Figures 8A, 8B, 8C, 8D:
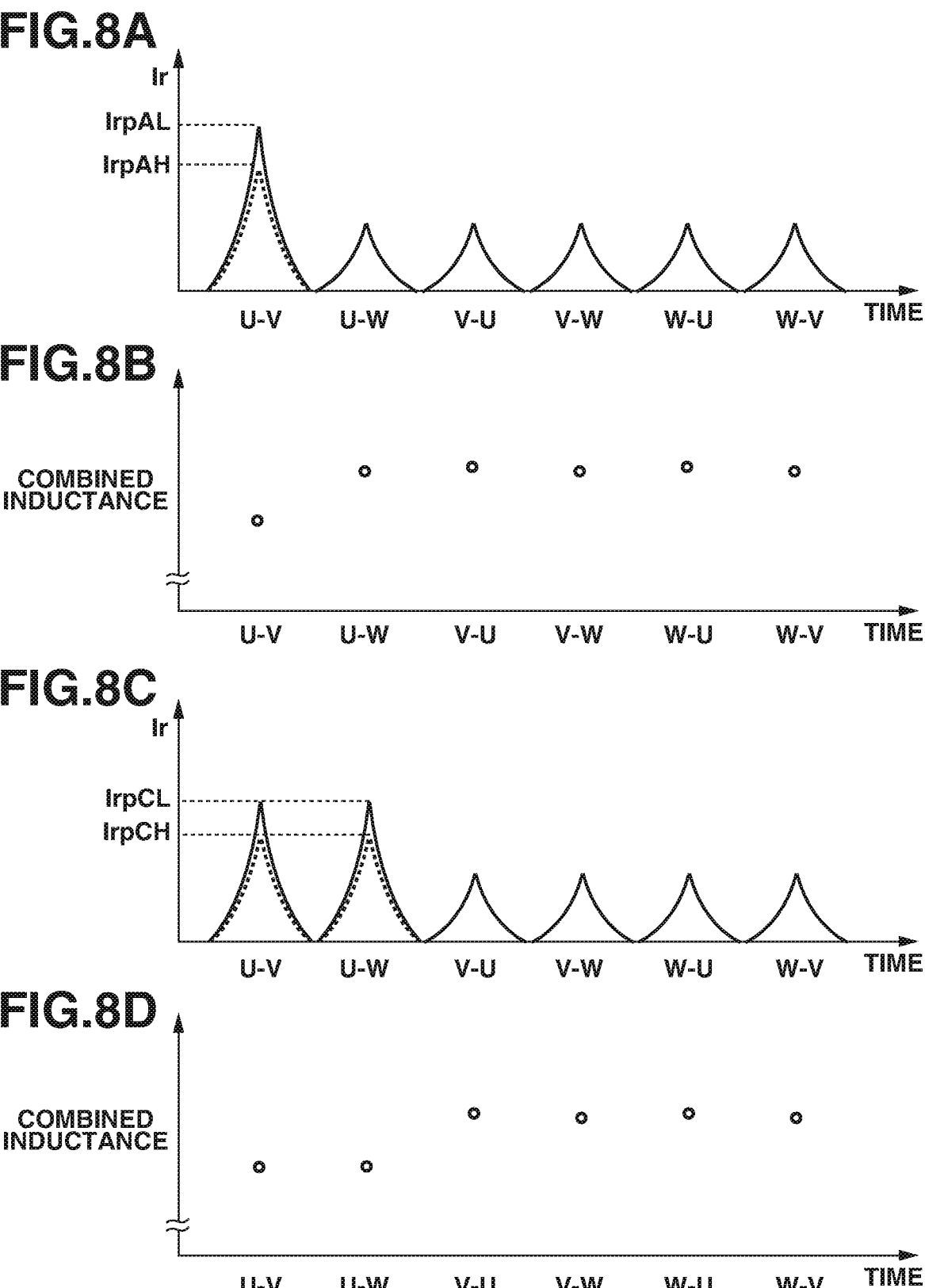
FIGS. 8A to 8D are diagrams illustrating examples of a measurement value of an excitation current in a case where a plurality of excitation phases is sequentially excited, and a combined inductance corresponding to each excitation phase.

FIG. 8A illustrates an example of a change over time in an excitation current Ir measured by the microcomputer 51 in a case where the plurality of excitation phases is sequentially excited. As described above, the excitation current Ir is detected using the resistor 63 and the AD converter 53. The microcomputer 51 detects the peak value of the excitation current Ir measured when each excitation phase is excited.

FIG. 8B illustrates an example of the combined inductance of each excitation phase obtained from the peak value of the excitation current Ir illustrated in FIG. 8A. As illustrated in FIG. 8B, the greater the peak value of the excitation current Ir obtained in a case where each excitation phase is excited using the PWM signals in the same pattern is, the greater the amount of decrease in the combined inductance is. As described above, the greater the influence of the external magnetic field is, the greater the amount of decrease in the combined inductance of each excitation phase due to the influence of the external magnetic field is.

In FIG. 8A, the peak value of the excitation current Ir corresponding to the U-V phase is the greatest among the six excitation phases. Accordingly, in FIG. 8B, the combined inductance of the U-V phase is the smallest. This is because the rotor 72 is located at the position at which the influence of the external magnetic field on the U-V phase is the greatest among the six excitation phases. In other words, it is understood that the rotor 72 is located at the position at which the rotor 72 stops in a case where the U-V phase is excited (the position illustrated in FIG. 4A).

As described in the first exemplary embodiment, the amount of change (the amount of decrease) in the inductance of the coils 73, 74, and 75 due to the influence of the external magnetic field changes according to a change in the temperature of the magnet of the rotor 72. A solid line in FIG. 8A indicates the measurement result of the peak value of the excitation current Ir in a case where the temperature of the rotor 72 is low. A dashed line in FIG. 8A indicates the measurement result of the peak value of the excitation current Ir in a case where the temperature of the rotor 72 is high.

A peak value IrpAH of the excitation current Ir corresponding to the U-V phase in a case where the temperature of the rotor 72 is high, in other words, in a case where the coil temperature is high, is smaller than a peak value IrpAL in a case where the temperature of the rotor 72 is low, in other words, in a case where the coil temperature is low. This indicates that if the temperature of the rotor 72 rises, the magnet demagnetizes, the amount of decrease in the combined inductance of the U-V phase due to the influence of the external magnetic field decreases, and as a result, the peak value of the excitation current Ir decreases. In contrast to this, regarding the five excitation phases other than the U-V phase, even if the temperature of the rotor 72 changes, the combined inductance of the excitation phase (or the peak value of the excitation current Ir) hardly changes. FIG. 8A illustrates the state where the solid line and the dashed line almost overlap each other. This is because the influence of the external magnetic field generated by the rotor 72 is inherently small.

FIG. 8C illustrates an example where a change over time in the measurement value of the excitation current Ir in a case where the position of the rotor 72 is changed to a position shifted, from the position corresponding to FIG. 8A (the position corresponding to the U-V phase), by the rotor 72 being rotated by an electrical angle of 30 degrees. As in FIG. 8A, a solid line in FIG. 8C indicates the measurement result of the peak value of the excitation current Ir in a case where the temperature of the rotor 72 is low. A dashed line in FIG. 8C indicates the measurement result of the peak value of the excitation current Ir in a case where the temperature of the rotor 72 is high. The peak value of the excitation current Ir corresponding to each of the U-V phase and the U-W phase among the six excitation phases is greater than the peak value of each of the other phases. FIG. 8D illustrates an example of the combined inductance of each excitation phase obtained from the peak value of the excitation current Ir illustrated in FIG. 8C.

A peak value IrpCH of the excitation current Ir corresponding to each of the U-V phase and the U-W phase in a case where the temperature of the rotor 72 is high, in other words, in a case where the coil temperature is high, is smaller than a peak value IrpCL in a case where the temperature of the rotor 72 is low, in other words, in a case where the coil temperature is low. The peak values IrpCL and IrpCH are both higher than the peak value of the excitation current Ir corresponding to each of the other four excitation phases. This is because, as described above, the influence of the external magnetic field generated by the rotor 72 on the combined inductance of each of the U-V phase and the U-W phase corresponding to the stop position of the rotor 72 is great.

As described above, there are one or two excitation phases in which the peak value of the excitation current Ir is the greatest according to the stop position of the rotor 72. The peak value of the excitation current Ir changes according to the temperature of the rotor 72. Since the temperature of the rotor 72 and the coil temperature are correlated to each other, the coil temperature can be estimated based on information indicating the correspondence relationship between the peak value (or the combined inductance value) of the excitation current Ir corresponding to each of the plurality of excitation phases and the temperature of the coils, as in the first exemplary embodiment. Hereinafter, the greatest peak value of the excitation current Ir will be referred to as a "first peak value", and the second greatest peak value will be referred to as a "second peak value". The first and second peak values can be the same value.

Figure 9:
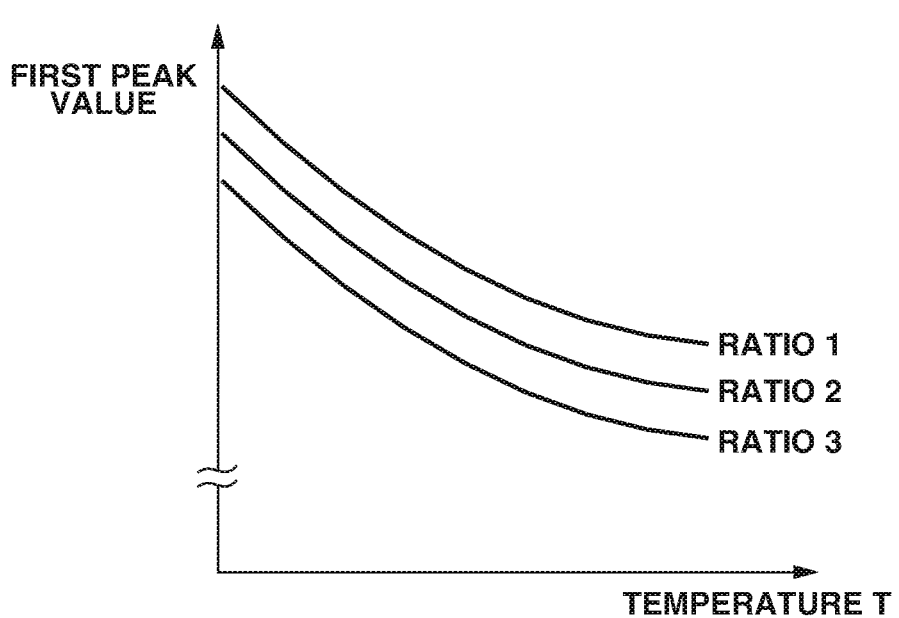
FIG. 9 is a diagram illustrating an example of a relationship between a current value and a coil temperature rise value.

The peak value changes according to the stop position of the rotor 72 and the coil temperature (the rotor temperature). Thus, to estimate the coil temperature from the peak value, information regarding the peak value and the coil temperature corresponding to the stop position of the rotor 72 is to be selected. The ratio between the first and second peak values changes according to the stop position of the rotor 72, and therefore, in the present exemplary embodiment, information regarding the correspondence relationship between the first peak value and the coil temperature is stored in advance according to the ratio between the first and second peak values. FIG. 9 illustrates an example of the information regarding the correspondence relationship between the first peak value and the coil temperature with respect to each ratio between the first and second peak values.

The information to be stored in the non-volatile memory 55 is not limited to the information as illustrated in FIG. 9, and may be, for example, information indicating a numerical table or information indicating an approximate curve. In a case where the coil temperature is estimated using the numerical table (i.e., information indicating discrete values), a method of referencing the closest value to the measured current value among the values stored in the non-volatile memory 55 may be used, or a method of, for example, linearly interpolating a plurality of values may be used.

<Flowchart>

Figure 10:
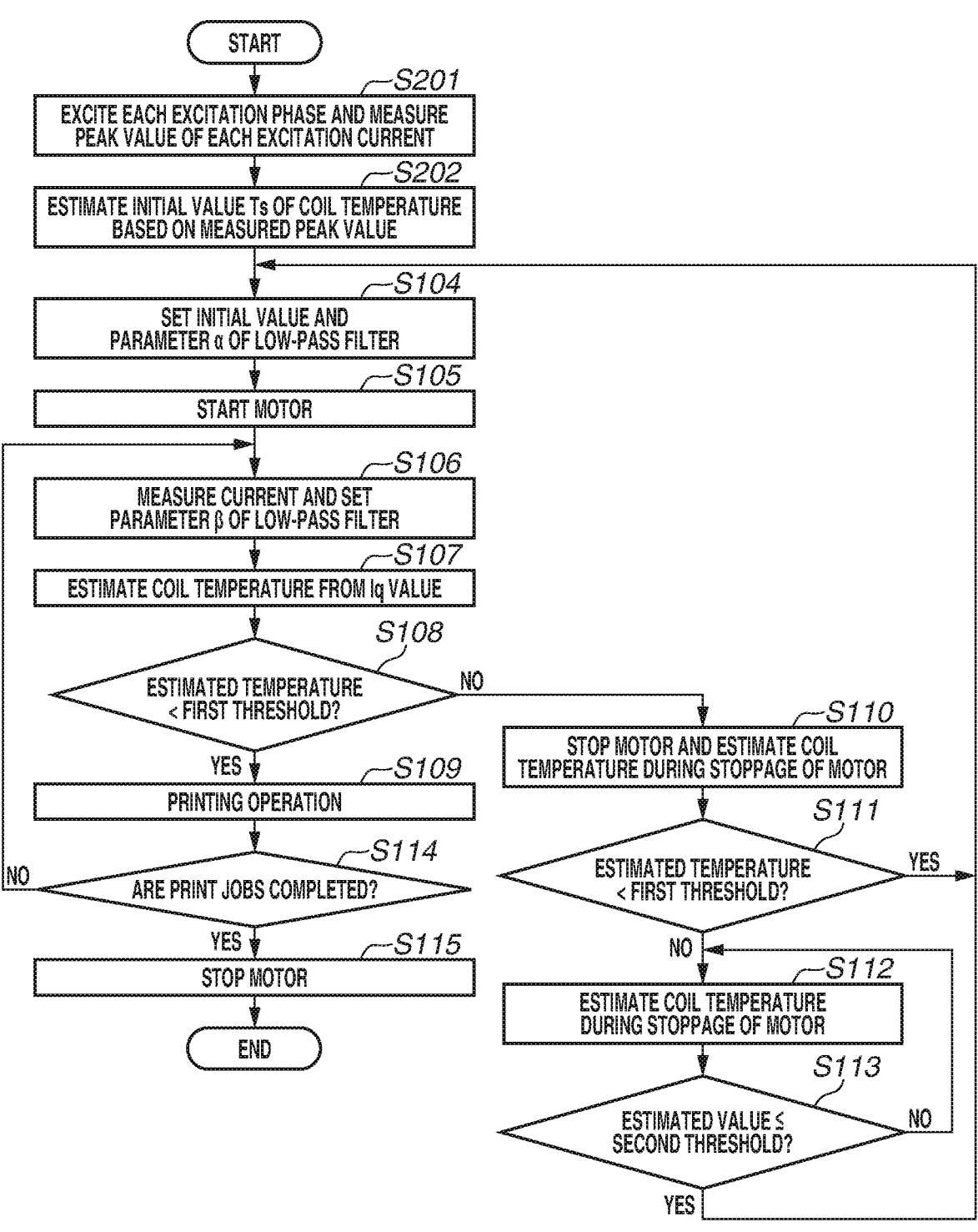
FIG. 10 is a flowchart illustrating processing regarding a coil temperature.

FIG. 10 is a flowchart illustrating processing regarding the coil temperature according to the present exemplary embodiment. Steps similar to those in FIG. 7 according to the first exemplary embodiment are designated by the same numbers, and are not described here.

In step S201, the motor control unit 14 sequentially excites each of the plurality of excitation phases in the state where the rotor 72 is stopped, and measures the peak value of the excitation current Ir. Here, the motor control unit 14 outputs from the PWM port 58 the PWM signals in a measurement pattern for measuring the peak value of the excitation current Ir flowing through the coils forming each excitation phase and drives the inverter 60. The motor control unit 14 measures the peak value of the excitation current Ir corresponding to each excitation phase.

In step S202, based on each of the plurality of measurement values corresponding to the plurality of excitation phases obtained by the measurement in step S201, the motor control unit 14 estimates the temperature estimated value Ts that is the initial temperature of the coils. If the estimation of the temperature estimated value Ts which is the initial temperature of the coils is completed, the processing proceeds to step S104. The operations in steps S104 to S115 are similar to those in FIG. 7, and thus are not described here.

As described above, a description has been provided in the present exemplary embodiment of a method of estimating the coil temperature in the stop state of the motor 15F with a pull-in process for the rotor 72 not being performed. It is possible to reduce as much downtime as the time taken for the pill-in process.

It is possible to mount the motor control unit 14 according to each of the first and second exemplary embodiments as a motor control device. It is further possible to mount portions of the motor control unit 14 and the printer control unit 11 related to motor control as a motor control device.

Although a case has been described where the fixing device 24 is driven as an example of the motor 15F, the disclosure can also be similarly applied to motors for driving the rollers related to the conveyance of a sheet in the image forming apparatus. Similarly, the disclosure can also be similarly applied to a motor for driving a member in the image forming unit 1 of the image forming apparatus.

The disclosure can also be implemented by the process of supplying a program for achieving one or more functions of the above exemplary embodiments to a system or an apparatus via a network or a storage medium, and of causing one or more processors of a computer of the system or the apparatus to read and execute the program. The disclosure can also be achieved by a circuit (e.g., an application-specific integrated circuit (ASIC)) for achieving the one or more functions.

According to the disclosure, it is possible to estimate the coil temperature of a motor without using a temperature sensor.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-086502, filed May 27, 2022, which is hereby incorporated by reference herein in its entirety.

What is claimed is:

1. A device comprising:
an application unit configured to apply a voltage to a motor including a plurality of coils to apply a current to the plurality of coils;
a detection unit configured to detect the current;
an estimation unit configured to estimate a coil temperature based on the detected current; and
a control unit configured to control driving of the motor based on the coil temperature,
wherein the estimation unit estimates a first coil temperature in a state where the motor is stopped, and a second coil temperature in a state where the motor is driven, and
wherein the control unit controls the driving of the motor based on the first coil temperature and the second coil temperature,
wherein, when estimating the first coil temperature while the motor is stopped, the estimation unit is configured to: cause the application unit to apply, to an excitation phase of the motor, a measurement voltage pattern for temperature estimation and for measuring a peak value of an excitation current, thereby causing the excitation current to flow; measure, as a physical quantity that changes according to an inductance of at least one of the plurality of coils, the peak value of the excitation current detected by the detection unit in response to the measurement voltage pattern; and estimate the first coil temperature from the measured peak value, and
wherein, when estimating the second coil temperature while the motor is being driven, the estimation unit is configured to: set an initial value of a temperature rise amount used to estimate the second coil temperature based on the first coil temperature or a coil temperature rise value obtained from the first coil temperature; update the temperature rise amount based on the current detected by the detection unit while the motor is being driven; and estimate the second coil temperature based on the updated temperature rise amount.

2. The device according to claim 1, wherein, in a case where the second coil temperature exceeds a first threshold, the control unit stops the motor.

3. The device according to claim 2, wherein, in the case where the second coil temperature exceeds the first threshold, the control unit rotates the motor for a predetermined period and then stops the motor.

4. The device according to claim 3, wherein, in the case where the second coil temperature exceeds the first threshold, the control unit reduces a load torque to be applied to the motor and rotates the motor for the predetermined period.

5. The device according to claim 3, wherein, in the case where the second coil temperature exceeds the first threshold, the control unit rotates the motor for the predetermined period by increasing the number of rotations of the motor compared to the number of rotations before the second coil temperature exceeds the first threshold.

6. The device according to claim 2, wherein, in a case where the first coil temperature falls below a second threshold after the motor is stopped, the control unit drives the motor.

7. The device according to claim 1, wherein, in a case where the estimation unit estimates the first coil temperature, the estimation unit estimates the coil temperature based on the current detected after a rotor is pulled into a predetermined phase and stopped.

8. The device according to claim 1, wherein, in a case where the estimation unit estimates the first coil temperature, the estimation unit estimates a stop position of a rotor from a plurality of detection results obtained by applying a voltage to each of the plurality of coils and detecting a current, and estimates the coil temperature.

9. An apparatus comprising:

the device according to claim 1;

a forming unit; and a fixing unit configured to fix an image formed by the forming unit to a sheet, wherein the motor drives the fixing unit.

10. The apparatus according to claim 9, wherein, in a case where the second coil temperature exceeds a first threshold, the control unit stops the motor.

11. The apparatus according to claim 10, wherein, in the case where the second coil temperature exceeds the first threshold, the control unit rotates the motor for a predetermined period and then stops the motor.

12. The apparatus according to claim 11, wherein, in the case where the second coil temperature exceeds the first threshold, the control unit reduces a load torque to be applied to the motor and rotates the motor for the predetermined period.

13. The apparatus according to claim 11, wherein, in the case where the second coil temperature exceeds the first threshold, the control unit rotates the motor for the predetermined period by increasing the number of rotations of the motor compared to the number of rotations before the second coil temperature exceeds the first threshold.

14. The apparatus according to claim 10, wherein, in a case where the first coil temperature falls below a second threshold after the motor is stopped, the control unit drives the motor.

15. The apparatus according to claim 9, wherein, in a case where the estimation unit estimates the first coil temperature, the estimation unit estimates the coil temperature based on the current detected after a rotor is pulled into a predetermined phase and stopped.

16. The apparatus according to claim 9, wherein, in a case where the estimation unit estimates the first coil temperature, the estimation unit estimates a stop position of a rotor from a plurality of detection results obtained by applying a voltage to each of the plurality of coils and detecting a current, and estimates the coil temperature.

* * * * *